(12) United States Patent
Ramasamy et al.

(10) Patent No.: US 12,549,662 B2
(45) Date of Patent: Feb. 10, 2026

(54) CONDITIONS FOR ENABLING A DO NOT DISTURB WHILE DRIVING MODE

(71) Applicant: QUALCOMM Incorporated, San Diego, CA (US)

(72) Inventors: Bala Ramasamy, San Marcos, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/068,423

(22) Filed: Dec. 19, 2022

(65) Prior Publication Data
US 2024/0205325 A1    Jun. 20, 2024

(51) Int. Cl.
*H04M 1/72454* (2021.01)
*H04M 1/72463* (2021.01)
*H04W 4/02* (2018.01)

(52) U.S. Cl.
CPC ... *H04M 1/72454* (2021.01); *H04M 1/72463* (2021.01); *H04W 4/027* (2013.01)

(58) Field of Classification Search
CPC ......... H04M 1/72454; H04M 1/72463; H04M 1/72415; H04M 1/724094; H04M 1/724098; H04W 4/027; G06F 1/163; G06F 1/1698; G06F 1/3231; G06F 1/3278; G06F 1/3287
See application file for complete search history.

(56) References Cited

U.S. PATENT DOCUMENTS

| | | | |
|---|---|---|---|
| 12,337,845 B1 | 6/2025 | White et al. | |
| 2004/0209594 A1* | 10/2004 | Naboulsi | B60R 11/0264 |
| | | | 455/403 |
| 2015/0084757 A1 | 3/2015 | Annibale et al. | |
| 2016/0205238 A1 | 7/2016 | Abramson et al. | |
| 2018/0093610 A1 | 4/2018 | Sun et al. | |
| 2018/0288217 A1* | 10/2018 | Rhyne | G08B 3/10 |
| 2018/0375983 A1 | 12/2018 | Bai | |
| 2019/0052748 A1* | 2/2019 | Stewart | H04M 1/72463 |
| 2019/0268418 A1 | 8/2019 | Sim et al. | |
| 2022/0048518 A1* | 2/2022 | Chan | B60W 30/08 |

FOREIGN PATENT DOCUMENTS

| | | |
|---|---|---|
| CA | 2822708 A1 | 12/2012 |
| WO | WO-2012170305 A1 * | 12/2012 ......... A61B 5/02055 |
| WO | WO-2016110857 A1 * | 7/2016 |

OTHER PUBLICATIONS

International Search Report and Written Opinion—PCT/US2023/078794—ISA/EPO—Feb. 15, 2024.
Huang H., et al., "MagTrack: Enabling Safe Driving Monitoring with Wearable Magnetics", Session 6: Simon Says, MobiSys '19, Jun. 17-21, 2019, Seoul, Korea, 15 Pages.

* cited by examiner

*Primary Examiner* — Farid Seyedvosoghi
(74) *Attorney, Agent, or Firm* — QUALCOMM Incorporated

(57) ABSTRACT

Disclosed are techniques for wireless communication. In an aspect, a user equipment (UE) receives sensor data from a wearable device associated with a user of the UE, determines that the user is driving a vehicle based on the sensor data, and enables a Do Not Disturb While Driving mode of the UE based on the determination that the user is driving the vehicle.

26 Claims, 7 Drawing Sheets

CONDITIONS FOR ENABLING A DO NOT DISTURB WHILE DRIVING MODE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving sensor data from a wearable device associated with a user of the UE; determining that the user is driving a vehicle based on the sensor data; and enabling a Do Not Disturb While Driving mode of the UE based on the determination that the user is driving the vehicle.

In an aspect, a user equipment (UE) includes a memory; at least one transceiver; and at least one processor communicatively coupled to the memory and the at least one transceiver, the at least one processor configured to: receive, via the at least one transceiver, sensor data from a wearable device associated with a user of the UE; determine that the user is driving a vehicle based on the sensor data; and enable a Do Not Disturb While Driving mode of the UE based on the determination that the user is driving the vehicle.

In an aspect, a user equipment (UE) includes means for receiving sensor data from a wearable device associated with a user of the UE; means for determining that the user is driving a vehicle based on the sensor data; and means for enabling a Do Not Disturb While Driving mode of the UE based on the determination that the user is driving the vehicle.

In an aspect, a non-transitory computer-readable medium stores computer-executable instructions that, when executed by a user equipment (UE), cause the UE to: receive sensor data from a wearable device associated with a user of the UE; determine that the user is driving a vehicle based on the sensor data; and enable a Do Not Disturb While Driving mode of the UE based on the determination that the user is driving the vehicle.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
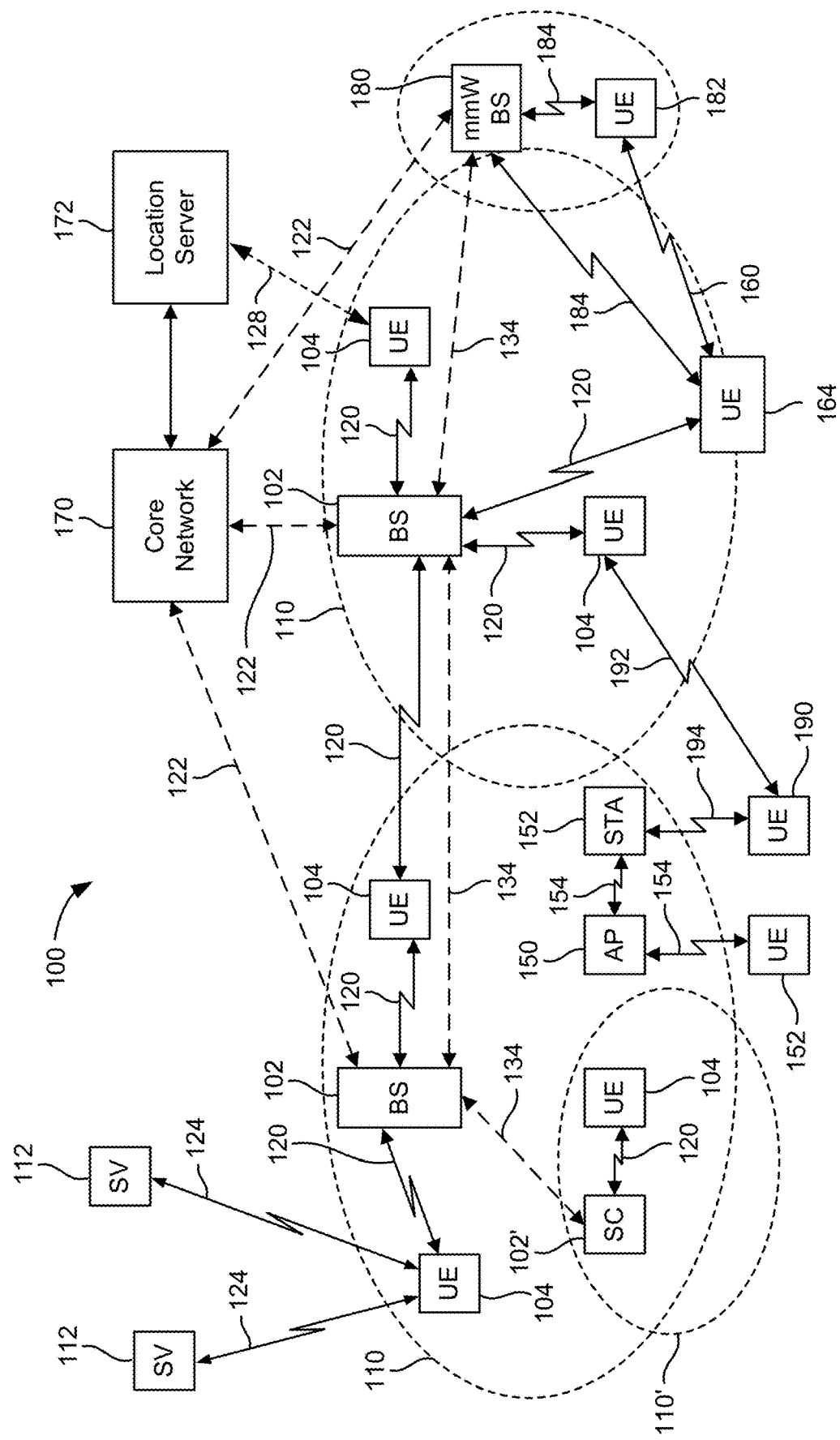
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, smart glasses, augmented reality (AR)/virtual reality (VR)/extended reality (XR) headset, etc.), vehicle (e.g., automobile, motorcycle, bicycle, etc.), Internet of Things (IOT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally).

With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (cV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
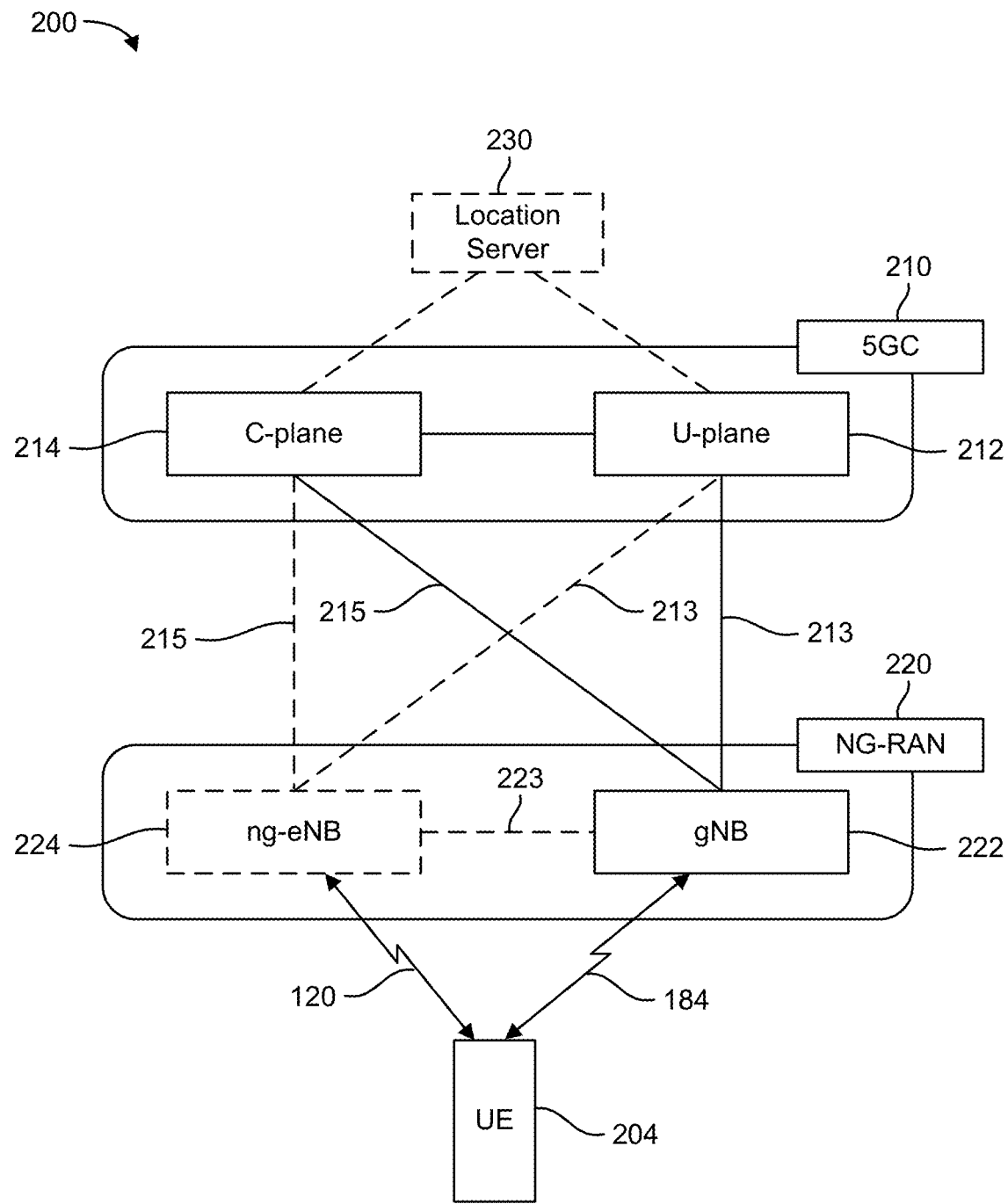
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
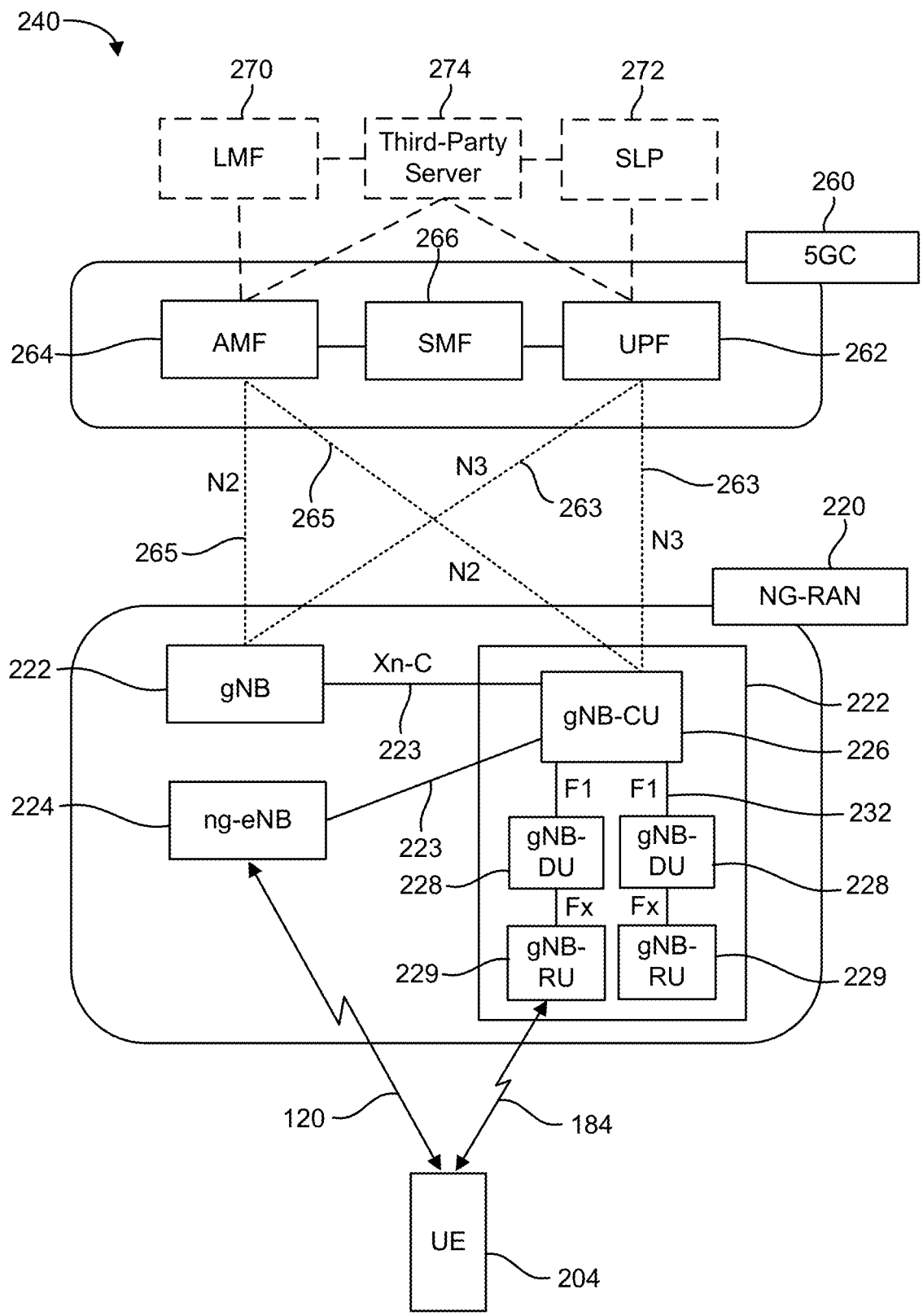

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-cNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-cNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC. SDAP, and PDCP layers, with a gNB-DU 228 via the RLC and MAC layers, and with a gNB-RU 229 via the PHY layer.

Figure 3:
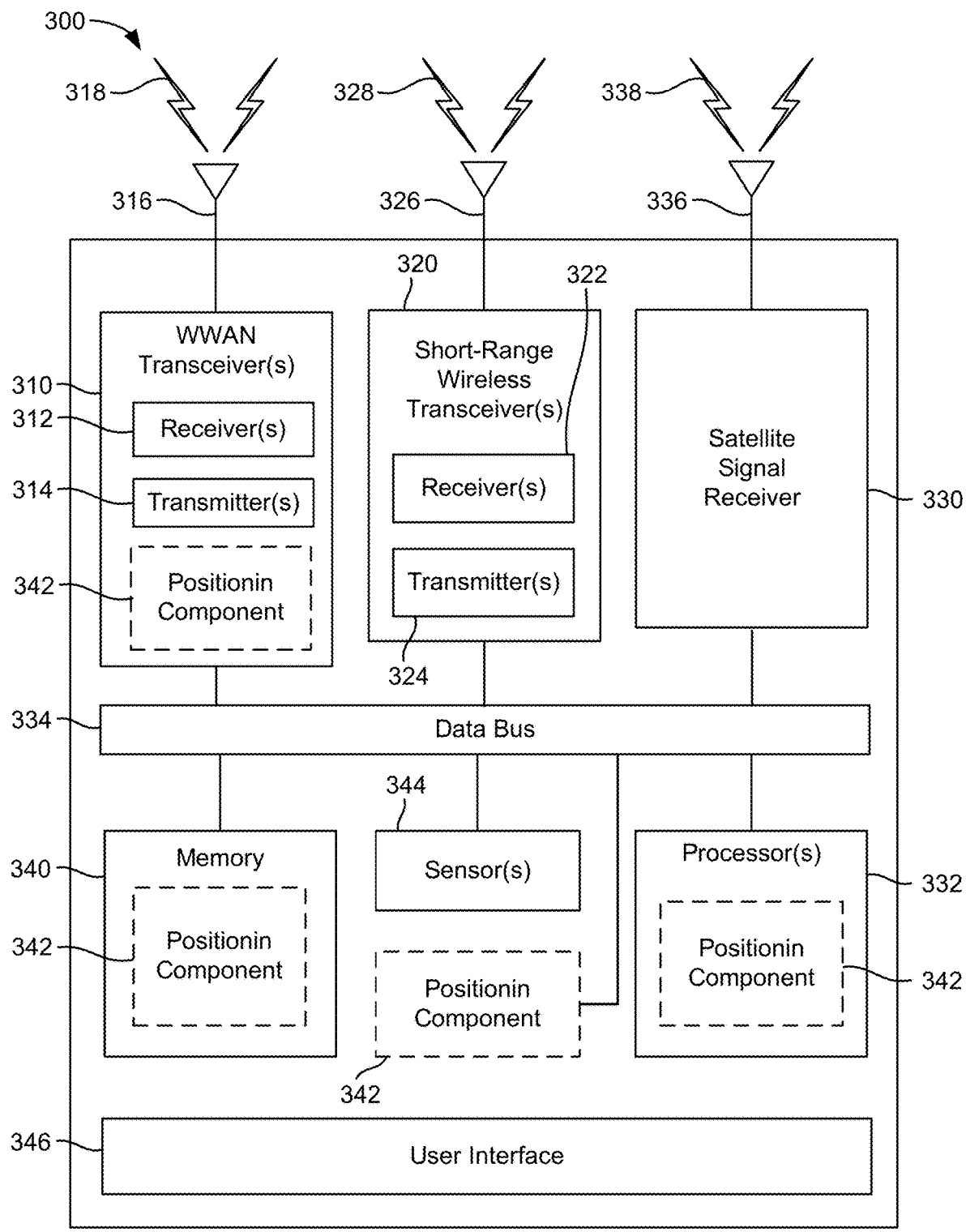
FIG. 3 illustrates an example user equipment (UE) architecture, according to various aspects of the disclosure.

FIG. 3 illustrates several example components (represented by corresponding blocks) that may be incorporated into a UE 300 (which may correspond to any of the UEs described herein). It will be appreciated that these components may be implemented in different types of apparatuses in different implementations (e.g., in an application-specific integrated circuit (ASIC), in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 300 includes one or more wireless wide area network (WWAN) transceivers 310 providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The one or more WWAN transceivers 310 may each be connected to one or more antennas 316 for communicating with other network nodes, such as other UEs, access points, base stations (e.g., eNBs, gNBs), etc., via at least one designated RAT (e.g., NR. LTE, GSM, etc.) over a wireless communication medium of interest (e.g., some set of time/frequency resources in a particular frequency spectrum). The one or more WWAN transceivers 310 may be variously configured for transmitting and encoding signals 318 (e.g., messages, indications, information, and so on) and, conversely, for receiving and decoding signals 318 (e.g., messages, indications, information, pilots, and so on) in accordance with the designated RAT. Specifically, the one or more WWAN transceivers 310 include one or more transmitters 314 for transmitting and encoding signals 318 and one or more receivers 312 for receiving and decoding signals 318.

The UE 300 also includes, at least in some cases, one or more short-range wireless transceivers 320. The one or more short-range wireless transceivers 320 may be connected to one or more antennas 326 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The one or more short-range wireless transceivers 320 may be variously configured for transmitting and encoding signals 328 (e.g., messages, indications, information, and so on) and, conversely, for receiving and decoding signals 328 (e.g., messages, indications, information, pilots, and so on) in accordance with the designated RAT. Specifically, the one or more short-range wireless transceivers 320 include one or more transmitters 324 for transmitting and encoding signals 328 and one or more receivers 322 for receiving and decoding signals 328. As specific examples, the one or more short-range wireless transceivers 320 may be Wi-Fi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 300 also includes, at least in some cases, a satellite signal receiver 330. The satellite signal receiver 330 may be connected to one or more antennas 336 and may provide means for receiving and/or measuring satellite positioning/communication signals 338. Where the satellite signal receiver 330 is a satellite positioning system receiver, the satellite positioning/communication signals 338 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receiver 330 is a non-terrestrial network (NTN) receiver, the satellite positioning/communication signals 338 may be communication signals (e.g., carrying control and/or user data) originating from a 5G network. The satellite signal receiver 330 may comprise any suitable hardware and/or software for receiving and processing satellite positioning/communication signals 338. The satellite signal receiver 330 may request information and operations as appropriate from the other systems, and, at least in some cases, perform calculations to determine locations of the UE 300 using measurements obtained by any suitable satellite positioning system algorithm.

A transceiver may be configured to communicate over a wired or wireless link. A transceiver (whether a wired transceiver or a wireless transceiver) includes transmitter circuitry (e.g., transmitters 314, 324) and receiver circuitry (e.g., receivers 312, 322). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver may be coupled to one or more wired network interface ports. Wireless transmitter circuitry (e.g., transmitters 314, 324) may include or be coupled to a plurality of antennas (e.g., antennas 316, 326), such as an antenna array, that permits the respective apparatus (e.g., UE 300) to perform transmit "beamforming," as described herein. Similarly, wireless receiver circuitry (e.g., receivers 312, 322) may include or be coupled to a plurality of antennas (e.g., antennas 316, 326), such as an antenna array, that permits the respective apparatus (e.g., UE 300) to perform receive beamforming, as described herein. In an aspect, the transmitter circuitry and receiver circuitry may share the same plurality of antennas (e.g., antennas 316, 326), such that the respective apparatus can only receive or transmit at a given time, not both at the same time. A wireless transceiver (e.g., the one or more WWAN transceivers 310, the one or more short-range wireless transceivers 320) may also include a network listen module (NLM) or the like for performing various measurements.

As used herein, the various wireless transceivers (e.g., transceivers 310, 320) and wired transceivers may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 300) and a base station will generally relate to signaling via a wireless transceiver.

The UE 300 also includes other components that may be used in conjunction with the operations as disclosed herein. The UE 300 includes one or more processors 332 for providing functionality relating to, for example, wireless communication, and for providing other processing functionality. The one or more processors 332 may therefore provide means for processing, such as means for determining, means for calculating, means for receiving, means for transmitting, means for indicating, etc. In an aspect, the one or more processors 332 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 300 includes memory circuitry implementing memory 340 (e.g., each including a memory device) for maintaining information (e.g., information indicative of reserved resources, thresholds, parameters, and so on). The memory 340 may therefore provide means for storing, means for retrieving, means for maintaining, etc. In some cases, the UE 300 may include a Do Not Disturb component 342. The Do Not Disturb component 342 may be hardware circuits that are part of or coupled to the one or more processors 332 that, when executed, cause the UE 300 to perform the functionality described herein. In other aspects, the Do Not Disturb component 342 may be external to the processors 332 (e.g., part of a modem processing system, integrated with another processing system, etc.). Alternatively, the Do Not Disturb component 342 may be a memory module stored in the memory 340 that, when executed by the one or more processors 332 (or a modem processing system, another processing system, etc.), cause the UE 300 to perform the functionality described herein. FIG. 3 illustrates possible locations of the Do Not Disturb component 342, which may be, for example, part of the one or more WWAN transceivers 310, the memory 340, the one or more processors 332, or any combination thereof, or may be a standalone component.

The UE 300 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include one or more accelerometers (e.g., micro-electrical mechanical systems (MEMS) devices), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems. Note that at least the accelerometer and gyroscope may be referred to as "inertial" sensors.

The various components of the UE 300 may be communicatively coupled to each other over a data bus 334. In an aspect, the data bus 334 may form, or be part of, a communication interface of the UE 300.

In addition, the UE 300 includes a user interface 346 providing means for providing indications (e.g., audible and/or visual indications) to a user and/or for receiving user input (e.g., upon user actuation of a sensing device such a keypad, a touch screen, a microphone, and so on).

For convenience, the UE 300 is shown in FIG. 3 as including various components that may be configured according to the various examples described herein. It will be appreciated, however, that the illustrated components may have different functionality in different designs. In particular, various components in FIG. 3 are optional in alternative configurations and the various aspects include configurations that may vary due to design choice, costs, use of the device, or other considerations. For example, a particular implementation of UE 300 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. For brevity, illustration of the various alternative configurations is not provided herein, but would be readily understandable to one skilled in the art.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 300 (e.g., by execution of appropriate code and/or by appropriate configuration of processor components). For simplicity, various operations, acts, and/or functions are described herein as being performed "by a UE." However, as will be appreciated, such operations, acts, and/or functions may actually be performed by specific components or combinations of components of the UE 300, such as the one or more processors 332, the one or more transceivers 310 and 320, the memory 340, the Do Not Disturb component 342, etc.

Various original equipment manufacturers (OEMs) have implemented "Do Not Disturb While Driving" features on certain UEs (e.g., smartphones). These Do Not Disturb While Driving modes (also referred to as simply Do Not Disturb modes) automatically block at least the calling and texting functionality of the smartphone when the smartphone detects that it is traveling faster than some speed threshold (typically set to distinguish between walking, running, biking, and driving). In addition, the Do Not Disturb While Driving mode can only be disengaged by the user.

Currently, there is no differentiation between whether the UE enabling the Do Not Disturb While Driving mode belongs to the driver or a passenger. As can be appreciated, it can be frustrating for a passenger in a vehicle to have their UE automatically enable the Do Not Disturb While Driving mode. The present disclosure provides various techniques to determine whether a UE belongs to the driver of a vehicle or a passenger. Once the user's status has been determined, that status can be leveraged to enable or disable various features associated with the user, such as enabling or disabling the Do Not Disturb While Driving mode.

Many users wear "smart" wearable devices that are connected to (i.e., in communication with) their smartphone via a short-range wireless communication protocol, such as Bluetooth, Wi-Fi, or the like. Such wearable devices include "smart" watches, "smart" rings, fitness trackers, "smart" glasses, and the like. "Smart" devices are at least capable of wireless communication with one or more other devices, and generally include other functionality, such as tracking motion and/or location, capturing image data, monitoring biometrics, and the like. Wearable devices typically include inertial measurement units (IMUs) that can track motions made by the user. In addition, some wearable device, such as "smart" glasses and VR/AR/XR headsets, may include cameras. Accordingly, in an aspect, sensor data from a user's wearable device can be used to determine whether or not the user is the driver of the vehicle.

In an aspect, to determine whether the user is the driver, IMU data from the user's wearable device (e.g., a smart watch) can indicate whether at some point during the drive the motion of the user's arm corresponds with a consistent circular motion, similar to the motion of the user turning a steering wheel. This motion can be easily detected by a wearable device, such as a smart watch. In some cases, the steering wheel size (and possibly shape) may be known and used to cross-reference the detected motion with the circumference of the steering wheel. The size (and shape) may be preconfigured based on typical steering wheel sizes, or can be determined from a database of steering wheel dimensions, or the corresponding motion patterns can be crowd-sourced from multiple users of the same vehicle. Alternatively or in addition, the wearable device may learn the motion pattern of the user when driving the vehicle.

It is easiest to identify that detected motion is steering wheel-related motion when the user is turning the steering wheel. The user may turn the wheel the most at the beginning of a drive, when the vehicle is navigating out of a driveway or parking lot, making this a good time to identify the driver even if the speed threshold has not been reached. As such, the wearable device (or the smartphone using the IMU data from the wearable device) may attempt to match detected motion to steering wheel motion regardless of whether the speed threshold has been reached. In some cases, the device may store a flag associated with determined beginning-of-drive motion patterns, such as frequent and sharp turns. In that way, if at a later time, it is determined that the same user is in the vehicle, then the Do Not Disturb While Driving mode can be triggered (alternatively, the sensor data could also be buffered and processed at that point).

In scenarios where the user's smartphone can receive steering angle information from the vehicle, the IMU data can additionally be correlated against the steering angle information to confirm that the user is driving the vehicle and not playing a game or performing some other activity. More specifically, the user's smartphone may determine whether the motion indicated by the IMU data is consistent with (within some threshold and/or during some period of time) the steering angle information. This technique can be further extended to provide a message to the user (e.g., via the smartphone's user interface) if it determines that the IMU data is not always consistent with the steering angle information from the vehicle. This message may request the user to confirm that they are the driver, or if it is known that the user is the driver, to remind the user to keep both hands on the wheel.

Where the user's smartphone has access to steering wheel movement as detected by the vehicle, the smartphone does not need to determine whether the movement indicated by the IMU data from the wearable device is planar (i.e., follows the plane of the steering wheel). Rather, it simply needs to determine whether the movement of the wearable device, at least some part of the time (e.g., when the user's hand would be on the steering wheel and the wheel is being turned), is directionally synchronized with the movement of the steering wheel. That is, the device may determine whether and how the circular motion of the wearable device corresponds, or potentially corresponds, to the steering wheel motion, and is therefore not just a random circular motion being performed.

In some cases, users attempt to spoof driver monitoring system (DMS) safety features, such as the Do Not Disturb While Driving feature. As such, the smartphone (or wearable device) should be able to distinguish between actual motion associated with the user turning the steering wheel and the user simply attaching the wearable device to the steering wheel or taking the wearable device off to hide any motion. In an aspect, if there is 100% correlation between steering wheel movement and the movement detected by the wearable device, then it may indicate that the wearable device is attached to the steering wheel. This would require the steering angle information from the vehicle. In another aspect, the wearable device may detect a biometric marker, such as pulse, to ensure that the user is still wearing the wearable device.

Where the wearable device has a camera (e.g., "smart" glasses), image data from the wearable device may be used to determine whether the user is sitting in the driver's seat (e.g., in front of a steering wheel). If it is determined that the user is sitting in front of a steering wheel (or there is some other visual indication that the user is in the driver seat), then the speed threshold may be bypassed and the smartphone can automatically enable the Do Not Disturb While Driving mode.

If the wearable device can monitor its speed, then it may be able to make the determination of whether the user is the driver and then notify the user's smartphone. Alternatively, the wearable device can simply transmit the IMU and/or image data to the smartphone for the smartphone to make the determination. As yet another alternative, the wearable device and the smartphone may coordinate with each other to make the determination. For example, the smartphone may request that the wearable device also provide other sensor information, such as the user's pulse rate (e.g., to ensure that the determination is not being spoofed).

If the user is determined to be the driver and the speed threshold has been reached, then the smartphone can engage the Do Not Disturb While Driving mode. Alternatively, the smartphone may refrain from engaging the Do Not Disturb While Driving mode until it has been determined that the user is the driver. However, if it is determined that the user is not the driver, then regardless of whether the speed threshold has been reached, the smartphone will refrain from enabling the Do Not Disturb While Driving mode.

In an aspect, in addition to using IMU data to determine whether the user is the driver, or as an alternative technique, the user's smartphone can access mobile device ticket information that may indicate whether the user is expected to or has recently entered a public transportation vehicle or a ride share vehicle. If implemented in the operating system, for example, the smartphone would know which applications (e.g., Uber, Lyft, public transportation apps, etc.) are accessing location information and when the application is accessing a wallet application programming interface (API). There may also be explicit feedback from the application to indicate the state of transportation with respect to the user, when the ride will commence, the duration, etc. This information may also be accessed via a maps application API, which would indicate what part of the journey the user is on and what transportation mode they have selected for that part of the journey. If the ticket information indicates that the user is traveling on public transportation or by ride share and the smartphone's current speed exceeds the threshold, then it can prevent the Do Not Disturb While Driving mode from being engaged.

In some cases, the vehicle may be preconfigured to associate a driver profile with a particular mobile device. Accordingly, in addition to using IMU data to determine whether the user is the driver, or as an alternative technique, (1) the vehicle may notify the mobile device (e.g., the driver's smartphone) that the driver profile it is associated with is currently active (i.e., driving), or (2) the mobile device may request the vehicle to indicate whether it is associated with a driver profile that is currently active. If the mobile device is associated with an active driver profile, then it is determined that the user of the mobile device is the driver. In response, the device can enable the Do Not Disturb While Driving mode, and allow it to notify other devices that they are non-driving devices.

The driver determination may be based on a confidence threshold. That is, the smartphone may determine the driver based on the IMU data with a certain level of confidence. If that level of confidence is below a threshold, then the smartphone can display a notification asking the user to confirm whether or not they are driving.

Other features can be enabled or disabled based on a determination of whether the user is the driver. In an aspect, the driver's smartphone may be given priority to vehicle systems over other user devices in the vehicle. For example, the driver's smartphone may be given priority access to the audio system of the vehicle.

In another aspect, other devices belonging to the driver (e.g., a tablet computer, laptop computer) may be disabled, or certain features and/or applications disabled, to prevent the driver from being distracted. For example, a movie streaming application on a user's tablet may be disabled based on a determination that the user is the driver.

In another aspect, once the driver has been determined and the smartphone switched to Do Not Disturb While Driving mode, the IMU data from the wearable device can be used to determine opportunities to provide notifications to the driver (e.g., of new text messages or call) or permit certain activities (e.g., calls). For example, if the IMU data from the wearable device indicates movement above some threshold, the smartphone may determine not to provide notifications to the user. In contrast, if the amount of movement is less than some threshold, it may be a good time to provide notifications or to allow the user to make a call.

In a related aspect, the smartphone may determine based on map data and/or image data from vehicle cameras that the vehicle is stopped at a traffic light. In that case, the smartphone may permit user interaction with the smartphone, such as by providing any missed notifications or permitting the driver to text or make calls. This determination may also be triggered by the IMU data indicating a lack of steering wheel motion.

In another aspect, the driver determination can be used to enable, or improve, crash detection. It can also broadcast (e.g., via UWB, P2P, etc.) a notification to other devices in the vehicle to enable crash detection. In this way, the devices can collectively determine whether there has been a crash based on doppler and/or movement over time. This avoids the false positives that might occur where crash detection is enabled based on accelerometers (e.g., the roller coaster false positive problem). Note that identifying the driver based on driver profile (as described above) can also be used to enable the crash detection feature. In addition, the notification does not have to be broadcasted, it could be transmitted via point-to-point communication. For example, the driver's device may determine that certain nearby devices appear to be co-located for a period of time (e.g., as if together in a vehicle). The device can then transmit the notification to those nearby devices. Alternatively, there may be no co-location check, and the driver's device may simply transmit the notification to nearby devices. Further, in some cases, the nearby device(s) may be notified that someone else has been identified as the driver of the vehicle, and in response, crash detection can be enabled on the mobile device(s) of the passenger(s).

In another aspect, once the driver has been determined, the driver's smartphone may provide navigation-related notifications to the driver's wearable device. For example, the smartphone may notify the wearable that the driver has made a wrong turn, and in response, the wearable can vibrate or provide some other feedback to the user. In addition, different patterns of vibrations may have different meanings, and may even indicate which direction the vehicle should turn at an intersection.

A user's wearable device may also be able to identify the user's state prior to entering a vehicle (e.g., unstable or drunk, heart issues, tired, etc.). The wearable device may communicate this information to the vehicle. This can enable a more informed driver monitoring system (DMS), which can look for particular signs from the user (e.g., sleepiness) to confirm the determination of the wearable. If it is determined the user is in the driver's seat, the vehicle may prevent the vehicle from starting, or it may only allow autonomous operations to be engaged.

In an aspect, the user's state may be determined by observing the user's patterns of motion over time to establish a baseline. Once the baseline is established, the user's state may be determined based on the type of motion variation (beyond some threshold) from the baseline. For example, less motion may indicate sleepiness, while more erratic motion may indicate drunkenness).

In an aspect, the IMU data from the wearable device may indicate other interactions with the vehicle. For example, the IMU data may indicate choppy or erratic motion that may indicate that the user is attempting to adjust some vehicle control (e.g., the volume on the sound system, the windshield wiper stalk, the rearview mirror, etc.). In that case, the smartphone display a notification asking the user if they would like the interior lights switched ON, or directly instruct the vehicle to turn ON the interior lights.

Figure 4:
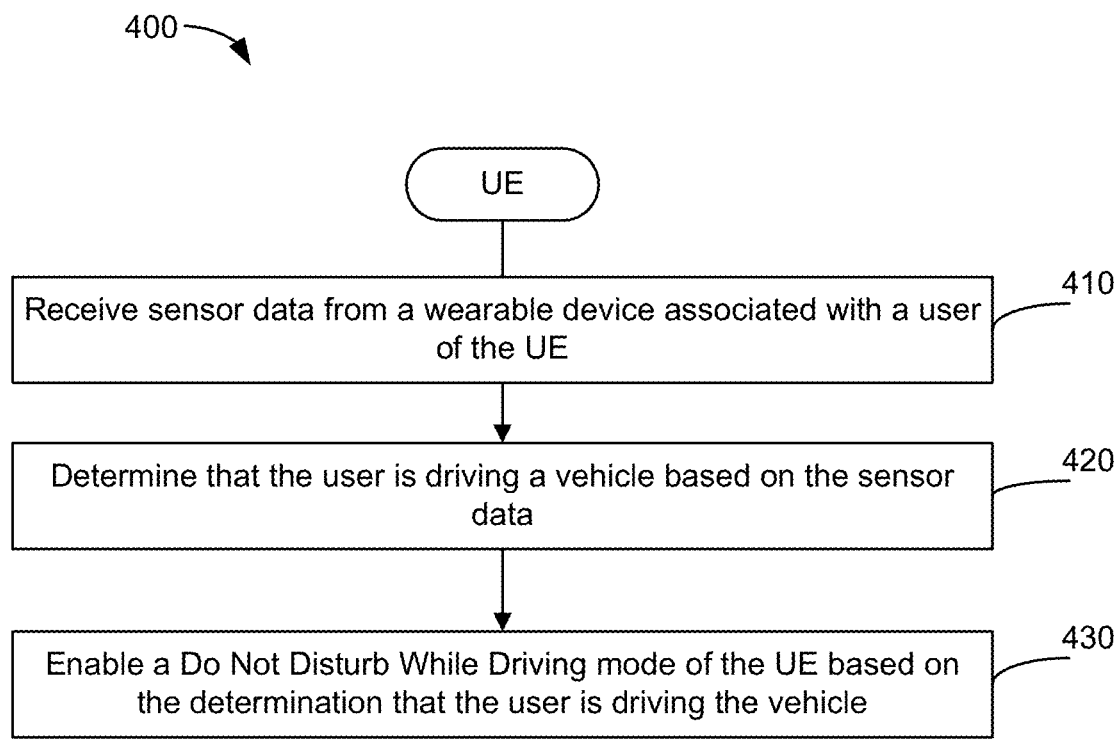
FIGS. 4 to 6 illustrate example methods of wireless communication, according to aspects of the disclosure.

FIG. 4 illustrates an example method 400 of wireless communication, according to aspects of the disclosure. In an aspect, method 400 may be performed by a UE (e.g., a smartphone).

At 410, the UE receives sensor data from a wearable device associated with a user of the UE. In an aspect, operation 410 may be performed by the one or more WWAN transceivers 310, the one or more short-range wireless transceivers 320, the one or more processors 332, memory 340, and/or Do Not Disturb component 342, any or all of which may be considered means for performing this operation.

At 420, the UE determines that the user is driving a vehicle based on the sensor data. In an aspect, operation 420 may be performed by the one or more WWAN transceivers 310, the one or more short-range wireless transceivers 320, the one or more processors 332, memory 340, and/or Do Not Disturb component 342, any or all of which may be considered means for performing this operation.

At 430, the UE enables a Do Not Disturb While Driving mode of the UE based on the determination that the user is driving the vehicle. In an aspect, operation 430 may be performed by the one or more WWAN transceivers 310, the one or more short-range wireless transceivers 320, the one or more processors 332, memory 340, and/or Do Not Disturb component 342, any or all of which may be considered means for performing this operation.

As will be appreciated, a technical advantage of the method 400 is enabling the Do Not Disturb While Driving mode when the user has actually been determined to be the driver of the vehicle. There may also be processing and power benefits, insofar as certain applications and operating system functions are put to sleep in the Do Not Disturb While Driving mode. This may also speed up certain tasks since fewer tasks would be allowed to proceed. The method 400 may also allow for improved communication/latency, since only select applications (e.g., of more relevance to the user) would be allowed to proceed (e.g., a music application could prefetch without a video game application requesting additional data at the same time).

Figure 5:
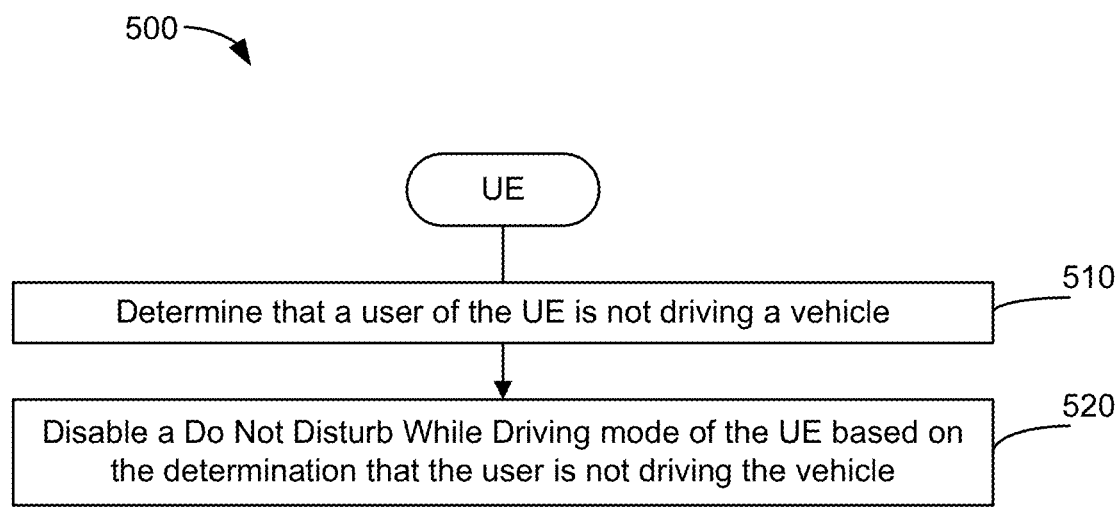

FIG. 5 illustrates an example method 500 of wireless communication, according to aspects of the disclosure. In an aspect, method 500 may be performed by a UE (e.g., a smartphone).

At 510, the UE determines that a user of the UE is not driving a vehicle. In an aspect, operation 510 may be performed by the one or more WWAN transceivers 310, the one or more short-range wireless transceivers 320, the one or more processors 332, memory 340, and/or Do Not Disturb component 342, any or all of which may be considered means for performing this operation.

At 520, the UE disables a Do Not Disturb While Driving mode of the UE based on the determination that the user is not driving the vehicle. In an aspect, operation 520 may be performed by the one or more WWAN transceivers 310, the one or more short-range wireless transceivers 320, the one or more processors 332, memory 340, and/or Do Not Disturb component 342, any or all of which may be considered means for performing this operation.

As will be appreciated, a technical advantage of the method 500 is preventing the Do Not Disturb While Driving mode from being enabled when the user is not the driver.

Figure 6:
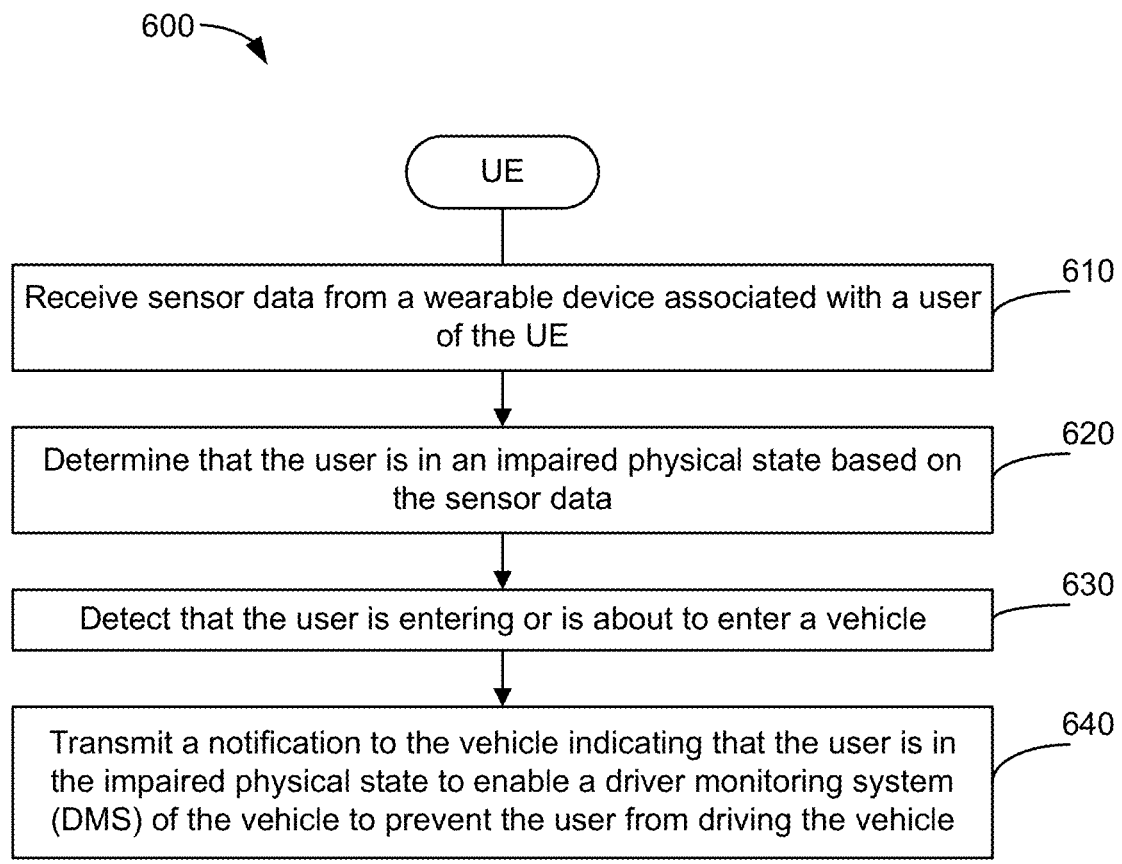

FIG. 6 illustrates an example method 600 of wireless communication, according to aspects of the disclosure. In an aspect, method 600 may be performed by a UE (e.g., a smartphone).

At 610, the UE receives sensor data from a wearable device associated with a user of the UE. In an aspect, operation 610 may be performed by the one or more WWAN transceivers 310, the one or more short-range wireless transceivers 320, the one or more processors 332, memory 340, and/or Do Not Disturb component 342, any or all of which may be considered means for performing this operation.

At 620, the UE determines that the user is in an impaired physical state based on the sensor data. In an aspect, operation 620 may be performed by the one or more WWAN transceivers 310, the one or more short-range wireless transceivers 320, the one or more processors 332, memory 340, and/or Do Not Disturb component 342, any or all of which may be considered means for performing this operation.

At 630, the UE detects that the user is entering or is about to enter a vehicle. In an aspect, operation 630 may be performed by the one or more WWAN transceivers 310, the one or more short-range wireless transceivers 320, the one or more processors 332, memory 340, and/or Do Not Disturb component 342, any or all of which may be considered means for performing this operation.

At 640, the UE transmits a notification to the vehicle indicating that the user is in the impaired physical state to enable a driver monitoring system (DMS) of the vehicle to prevent the user from driving the vehicle. In an aspect, operation 640 may be performed by the one or more WWAN transceivers 310, the one or more short-range wireless transceivers 320, the one or more processors 332, memory 340, and/or Do Not Disturb component 342, any or all of which may be considered means for performing this operation.

As will be appreciated, a technical advantage of the method 600 is preventing physically impaired drivers from driving a vehicle.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving sensor data from a wearable device associated with a user of the UE; determining that the user is driving a vehicle based on the sensor data; and enabling a Do Not Disturb While Driving mode of the UE based on the determination that the user is driving the vehicle.

Clause 2. The method of clause 1, wherein: the sensor data comprises motion sensor data obtained by the wearable device, and determining that the user is driving the vehicle based on the sensor data comprises determining that the user is driving the vehicle based on the motion sensor data indicating motion of the user consistent with turning a steering wheel of the vehicle.

Clause 3. The method of clause 2, further comprising: receiving steering angle information from the vehicle, wherein the determination that the user is driving the vehicle based on the motion sensor data indicating motion of the user consistent with turning the steering wheel of the vehicle is further based on the steering angle information.

Clause 4. The method of clause 3, further comprising: determining that the motion of the user is not always consistent with the steering angle information; and providing a notification to the user to remind the user to keep both hands on the steering wheel.

Clause 5. The method of any of clauses 3 to 4, wherein the motion sensor data indicates motion of the user consistent with turning the steering wheel of the vehicle based on the motion sensor data indicating motion of the user that is synchronized with the steering angle information for at least a threshold period of time.

Clause 6. The method of any of clauses 2 to 5, wherein the determination that the user is driving the vehicle based on the motion sensor data indicating motion of the user consistent with turning the steering wheel of the vehicle is based on: a crowdsourced database of motion patterns, a history of motion patterns of the user, a database of steering wheel dimensions, or any combination thereof.

Clause 7. The method of any of clauses 1 to 6, wherein: the sensor data comprises image data captured by the wearable device, and determining that the user is driving the vehicle based on the sensor data comprises determining that the image data indicates that the user is sitting in a driver's seat of the vehicle.

Clause 8. The method of any of clauses 1 to 7, further comprising: preventing user interaction with the UE based on the sensor data indicating that the vehicle is stopped; and permitting user interaction with the UE based on the sensor data indicating that the vehicle is moving.

Clause 9. The method of clause 8, wherein the user interaction comprises: making calls, receiving calls, receiving notifications, receiving text messages, sending text messages, or any combination thereof.

Clause 10. The method of any of clauses 1 to 9, further comprising: prioritizing access of the UE to an audio system of the vehicle based on the determination that the user is driving the vehicle.

Clause 11. The method of any of clauses 1 to 10, further comprising: disabling other personal devices associated with the user and located in the vehicle based on the determination that the user is driving the vehicle; or disabling one or more features, applications, or both on the other personal devices based on the determination that the user is driving the vehicle.

Clause 12. The method of any of clauses 1 to 11, further comprising: enabling crash detection based on the determination that the user is driving the vehicle.

Clause 13. The method of clause 12, further comprising: notifying nearby user devices to enable crash detection.

Clause 14. The method of any of clauses 1 to 13, further comprising: receiving a notification from the vehicle that the UE is associated with a driver profile preconfigured to the vehicle, wherein the determination that the user is driving the vehicle is further based on the UE being associated with the driver profile.

Clause 15. The method of clause 14, further comprising: transmitting a request to the vehicle to report whether the UE is associated with the driver profile preconfigured to the vehicle, wherein the notification is received from the vehicle in response to the request.

Clause 16. The method of any of clauses 1 to 15, further comprising: displaying a notification to the user to confirm that the user is driving the vehicle.

Clause 17. The method of any of clauses 1 to 16, wherein the determination that the user is driving the vehicle is made in response to a determination that the UE is traveling faster than a speed threshold.

Clause 18. The method of any of clauses 1 to 16, wherein the determination that the user is driving the vehicle is made before a determination that the UE is traveling faster than a speed threshold.

Clause 19. The method of any of clauses 1 to 18, wherein: the determination that the user is driving the vehicle is further based on a determination that the UE is traveling faster than a speed threshold, and the Do Not Disturb While Driving mode is enabled further based on the determination that the UE is traveling faster than the speed threshold.

Clause 20. The method of any of clauses 1 to 19, wherein the wearable device comprises: a smart watch, a smart ring, a fitness tracker, or smart glasses.

Clause 21. A method of wireless communication performed by a user equipment (UE), comprising: determining that a user of the UE is not driving a vehicle; and disabling a Do Not Disturb While Driving mode of the UE based on the determination that the user is not driving the vehicle.

Clause 22. The method of clause 21, further comprising: receiving sensor data from a wearable device associated with the user, wherein the determination that the user of the UE is not driving the vehicle is based on the sensor data from the wearable device.

Clause 23. The method of clause 22, wherein: the sensor data comprises motion sensor data obtained by the wearable device, and the determination that the user is not driving the vehicle comprises a determination that the user is not driving the vehicle based on the motion sensor data indicating motion of the user that is inconsistent with turning a steering wheel of the vehicle.

Clause 24. The method of clause 23, further comprising: receiving steering angle information from the vehicle, wherein the determination that the user is not driving the vehicle based on the motion sensor data indicating motion of the user that is inconsistent with turning the steering wheel of the vehicle is further based on the steering angle information.

Clause 25. The method of any of clauses 23 to 24, wherein the determination that the user is not driving the vehicle based on the motion sensor data indicating motion of the user that is inconsistent with turning the steering wheel of the vehicle is based on: a crowdsourced database of motion patterns, a history of motion patterns of the user, a database of steering wheel dimensions, or any combination thereof.

Clause 26. The method of any of clauses 23 to 25, further comprising: obtaining biometric sensor data from the wearable device based on the determination that the user is not driving the vehicle based on the motion sensor data indicating motion of the user that is inconsistent with turning the steering wheel of the vehicle, wherein the determination that the user is not driving the vehicle is further based on the biometric sensor data indicating that the wearable device is being worn by the user.

Clause 27. The method of any of clauses 22 to 26, wherein: the sensor data comprises image data captured by the wearable device, and determining that the user is not driving the vehicle comprises determining that the image data indicates that the user is not sitting in a driver's seat of the vehicle.

Clause 28. The method of any of clauses 22 to 27, wherein the wearable device comprises: a smart watch, a smart ring, a fitness tracker, or smart glasses.

Clause 29. The method of any of clauses 21 to 28, further comprising: receiving a notification from a user device of a driver of the vehicle to enable crash detection.

Clause 30. The method of any of clauses 21 to 29, wherein determining that the user is not driving the vehicle comprises: determining that the user is in a public transportation vehicle or a ride share vehicle.

Clause 31. The method of any of clauses 29 to 30, wherein the determination that the user is in the public transportation vehicle or the ride share vehicle is based on information from an application installed on the UE associated with the public transportation vehicle of the ride share vehicle.

Clause 32. The method of any of clauses 29 to 31, wherein the determination that the user is in the public transportation vehicle or the ride share vehicle is based on a type of transportation selected in a navigation application.

Clause 33. The method of any of clauses 21 to 32, wherein determining that the user is not driving the vehicle comprises: transmitting a request to the vehicle to report whether the UE is associated with a driver profile preconfigured to the vehicle; and receiving a notification from the vehicle that the UE is not associated with the driver profile preconfigured to the vehicle.

Clause 34. The method of any of clauses 21 to 33, wherein the determination that the user is not driving the vehicle is made in response to a determination that the UE is traveling faster than a speed threshold.

Clause 35. The method of any of clauses 21 to 33, wherein the determination that the user is not driving the vehicle is made before a determination that the UE is traveling faster than a speed threshold.

Clause 36. The method of any of clauses 21 to 35, further comprising: enabling the Do Not Disturb While Driving mode of the UE based on a determination that the UE is traveling faster than a speed threshold, wherein the Do Not Disturb While Driving mode of the UE is disabled based on the determination that the user of the UE is not driving the vehicle.

Clause 37. A method of wireless communication performed by a user equipment (UE), comprising: receiving sensor data from a wearable device associated with a user of the UE; determining that the user is in an impaired physical state based on the sensor data; detecting that the user is entering or is about to enter a vehicle; and transmitting a notification to the vehicle indicating that the user is in the impaired physical state to enable a driver monitoring system (DMS) of the vehicle to prevent the user from driving the vehicle.

Clause 38. The method of clause 37, wherein the impaired physical state comprises: drunkenness, heartbeat irregularities, sleepiness, or any combination thereof.

Clause 39. A user equipment (UE), comprising: a memory; at least one transceiver; and at least one processor communicatively coupled to the memory and the at least one transceiver, the at least one processor configured to: receive, via the at least one transceiver, sensor data from a wearable device associated with a user of the UE; determine that the user is driving a vehicle based on the sensor data; and enable a Do Not Disturb While Driving mode of the UE based on the determination that the user is driving the vehicle.

Clause 40. The UE of clause 39, wherein: the sensor data comprises motion sensor data obtained by the wearable device, and the at least one processor configured to determine that the user is driving the vehicle based on the sensor data comprises the at least one processor configured to determine that the user is driving the vehicle based on the motion sensor data indicating motion of the user consistent with turning a steering wheel of the vehicle.

Clause 41. The UE of clause 40, wherein the at least one processor is further configured to: receive, via the at least one transceiver, steering angle information from the vehicle, wherein the determination that the user is driving the vehicle based on the motion sensor data indicating motion of the user consistent with turning the steering wheel of the vehicle is further based on the steering angle information.

Clause 42. The UE of clause 41, wherein the at least one processor is further configured to: determine that the motion of the user is not always consistent with the steering angle information; and provide a notification to the user to remind the user to keep both hands on the steering wheel.

Clause 43. The UE of any of clauses 41 to 42, wherein the motion sensor data indicates motion of the user consistent with turning the steering wheel of the vehicle based on the motion sensor data indicating motion of the user that is synchronized with the steering angle information for at least a threshold period of time.

Clause 44. The UE of any of clauses 40 to 43, wherein the determination that the user is driving the vehicle based on the motion sensor data indicating motion of the user consistent with turning the steering wheel of the vehicle is based on: a crowdsourced database of motion patterns, a history of motion patterns of the user, a database of steering wheel dimensions, or any combination thereof.

Clause 45. The UE of any of clauses 39 to 44, wherein: the sensor data comprises image data captured by the wearable device, and the at least one processor configured to determine that the user is driving the vehicle based on the sensor data comprises the at least one processor configured to determine that the image data indicates that the user is sitting in a driver's seat of the vehicle.

Clause 46. The UE of any of clauses 39 to 45, wherein the at least one processor is further configured to: prevent user interaction with the UE based on the sensor data indicating that the vehicle is stopped; and permit user interaction with the UE based on the sensor data indicating that the vehicle is moving.

Clause 47. The UE of clause 46, wherein the user interaction comprises: making calls, receiving calls, receiving notifications, receiving text messages, sending text messages, or any combination thereof.

Clause 48. The UE of any of clauses 39 to 47, wherein the at least one processor is further configured to: prioritize access of the UE to an audio system of the vehicle based on the determination that the user is driving the vehicle.

Clause 49. The UE of any of clauses 39 to 48, wherein the at least one processor is further configured to: disable other personal devices associated with the user and located in the vehicle based on the determination that the user is driving the vehicle; or disable one or more features, applications, or both on the other personal devices based on the determination that the user is driving the vehicle.

Clause 50. The UE of any of clauses 39 to 49, wherein the at least one processor is further configured to: enable crash detection based on the determination that the user is driving the vehicle.

Clause 51. The UE of clause 50, wherein the at least one processor is further configured to: notify nearby user devices to enable crash detection.

Clause 52. The UE of any of clauses 39 to 51, wherein the at least one processor is further configured to: receive, via the at least one transceiver, a notification from the vehicle that the UE is associated with a driver profile preconfigured to the vehicle, wherein the determination that the user is driving the vehicle is further based on the UE being associated with the driver profile.

Clause 53. The UE of clause 52, wherein the at least one processor is further configured to: transmit, via the at least one transceiver, a request to the vehicle to report whether the UE is associated with the driver profile preconfigured to the vehicle, wherein the notification is received from the vehicle in response to the request.

Clause 54. The UE of any of clauses 39 to 53, wherein the at least one processor is further configured to: display a notification to the user to confirm that the user is driving the vehicle.

Clause 55. The UE of any of clauses 39 to 54, wherein the determination that the user is driving the vehicle is made in response to a determination that the UE is traveling faster than a speed threshold.

Clause 56. The UE of any of clauses 39 to 54, wherein the determination that the user is driving the vehicle is made before a determination that the UE is traveling faster than a speed threshold.

Clause 57. The UE of any of clauses 39 to 56, wherein: the determination that the user is driving the vehicle is further based on a determination that the UE is traveling faster than a speed threshold, and the Do Not Disturb While Driving mode is enabled further based on the determination that the UE is traveling faster than the speed threshold.

Clause 58. The UE of any of clauses 39 to 57, wherein the wearable device comprises: a smart watch, a smart ring, a fitness tracker, or smart glasses.

Clause 59. A user equipment (UE), comprising: a memory; at least one transceiver; and at least one processor communicatively coupled to the memory and the at least one transceiver, the at least one processor configured to: determine that a user of the UE is not driving a vehicle; and disable a Do Not Disturb While Driving mode of the UE based on the determination that the user is not driving the vehicle.

Clause 60. The UE of clause 59, wherein the at least one processor is further configured to: receive, via the at least one transceiver, sensor data from a wearable device associated with the user, wherein the determination that the user of the UE is not driving the vehicle is based on the sensor data from the wearable device.

Clause 61. The UE of clause 60, wherein: the sensor data comprises motion sensor data obtained by the wearable device, and the determination that the user is not driving the vehicle comprises a determination that the user is not driving the vehicle based on the motion sensor data indicating motion of the user that is inconsistent with turning a steering wheel of the vehicle.

Clause 62. The UE of clause 61, wherein the at least one processor is further configured to: receive, via the at least one transceiver, steering angle information from the vehicle, wherein the determination that the user is not driving the vehicle based on the motion sensor data indicating motion of the user that is inconsistent with turning the steering wheel of the vehicle is further based on the steering angle information.

Clause 63. The UE of any of clauses 61 to 62, wherein the determination that the user is not driving the vehicle based on the motion sensor data indicating motion of the user that is inconsistent with turning the steering wheel of the vehicle is based on: a crowdsourced database of motion patterns, a history of motion patterns of the user, a database of steering wheel dimensions, or any combination thereof.

Clause 64. The UE of any of clauses 61 to 63, wherein the at least one processor is further configured to: obtain biometric sensor data from the wearable device based on the determination that the user is not driving the vehicle based on the motion sensor data indicating motion of the user that is inconsistent with turning the steering wheel of the vehicle, wherein the determination that the user is not driving the vehicle is further based on the biometric sensor data indicating that the wearable device is being worn by the user.

Clause 65. The UE of any of clauses 60 to 64, wherein: the sensor data comprises image data captured by the wearable device, and the at least one processor configured to determine that the user is not driving the vehicle comprises the at least one processor configured to determine that the image data indicates that the user is not sitting in a driver's seat of the vehicle.

Clause 66. The UE of any of clauses 60 to 65, wherein the wearable device comprises: a smart watch, a smart ring, a fitness tracker, or smart glasses.

Clause 67. The UE of any of clauses 59 to 66, wherein the at least one processor is further configured to: receive, via the at least one transceiver, a notification from a user device of a driver of the vehicle to enable crash detection.

Clause 68. The UE of any of clauses 59 to 67, wherein the at least one processor configured to determine that the user is not driving the vehicle comprises the at least one processor configured to: determine that the user is in a public transportation vehicle or a ride share vehicle.

Clause 69. The UE of any of clauses 67 to 68, wherein the determination that the user is in the public transportation vehicle or the ride share vehicle is based on information from an application installed on the UE associated with the public transportation vehicle of the ride share vehicle.

Clause 70. The UE of any of clauses 67 to 69, wherein the determination that the user is in the public transportation vehicle or the ride share vehicle is based on a type of transportation selected in a navigation application.

Clause 71. The UE of any of clauses 59 to 70, wherein the at least one processor configured to determine that the user is not driving the vehicle comprises the at least one processor configured to: transmit, via the at least one transceiver, a request to the vehicle to report whether the UE is associated with a driver profile preconfigured to the vehicle; and receive, via the at least one transceiver, a notification from the vehicle that the UE is not associated with the driver profile preconfigured to the vehicle.

Clause 72. The UE of any of clauses 59 to 71, wherein the determination that the user is not driving the vehicle is made in response to a determination that the UE is traveling faster than a speed threshold.

Clause 73. The UE of any of clauses 59 to 71, wherein the determination that the user is not driving the vehicle is made before a determination that the UE is traveling faster than a speed threshold.

Clause 74. The UE of any of clauses 59 to 73, wherein the at least one processor is further configured to: enable the Do Not Disturb While Driving mode of the UE based on a determination that the UE is traveling faster than a speed threshold, wherein the Do Not Disturb While Driving mode of the UE is disabled based on the determination that the user of the UE is not driving the vehicle.

Clause 75. A user equipment (UE), comprising: a memory; at least one transceiver; and at least one processor communicatively coupled to the memory and the at least one transceiver, the at least one processor configured to: receive, via the at least one transceiver, sensor data from a wearable device associated with a user of the UE; determine that the user is in an impaired physical state based on the sensor data; detect that the user is entering or is about to enter a vehicle; and transmit, via the at least one transceiver, a notification to the vehicle indicating that the user is in the impaired physical state to enable a driver monitoring system (DMS) of the vehicle to prevent the user from driving the vehicle.

Clause 76. The UE of clause 75, wherein the impaired physical state comprises: drunkenness, heartbeat irregularities, sleepiness, or any combination thereof.

Clause 77. A user equipment (UE), comprising: means for receiving sensor data from a wearable device associated with a user of the UE; means for determining that the user is driving a vehicle based on the sensor data; and means for enabling a Do Not Disturb While Driving mode of the UE based on the determination that the user is driving the vehicle.

Clause 78. The UE of clause 77, wherein: the sensor data comprises motion sensor data obtained by the wearable device, and the means for determining that the user is driving the vehicle based on the sensor data comprises means for determining that the user is driving the vehicle based on the motion sensor data indicating motion of the user consistent with turning a steering wheel of the vehicle.

Clause 79. The UE of clause 78, further comprising: means for receiving steering angle information from the vehicle, wherein the determination that the user is driving the vehicle based on the motion sensor data indicating motion of the user consistent with turning the steering wheel of the vehicle is further based on the steering angle information.

Clause 80. The UE of clause 79, further comprising: means for determining that the motion of the user is not always consistent with the steering angle information; and means for providing a notification to the user to remind the user to keep both hands on the steering wheel.

Clause 81. The UE of any of clauses 79 to 80, wherein the motion sensor data indicates motion of the user consistent with turning the steering wheel of the vehicle based on the motion sensor data indicating motion of the user that is synchronized with the steering angle information for at least a threshold period of time.

Clause 82. The UE of any of clauses 78 to 81, wherein the determination that the user is driving the vehicle based on the motion sensor data indicating motion of the user consistent with turning the steering wheel of the vehicle is based on: a crowdsourced database of motion patterns, a history of motion patterns of the user, a database of steering wheel dimensions, or any combination thereof.

Clause 83. The UE of any of clauses 77 to 82, wherein: the sensor data comprises image data captured by the wearable device, and the means for determining that the user is driving the vehicle based on the sensor data comprises means for determining that the image data indicates that the user is sitting in a driver's seat of the vehicle.

Clause 84. The UE of any of clauses 77 to 83, further comprising: means for preventing user interaction with the UE based on the sensor data indicating that the vehicle is stopped; and means for permitting user interaction with the UE based on the sensor data indicating that the vehicle is moving.

Clause 85. The UE of clause 84, wherein the user interaction comprises: making calls, receiving calls, receiving notifications, receiving text messages, sending text messages, or any combination thereof.

Clause 86. The UE of any of clauses 77 to 85, further comprising: means for prioritizing access of the UE to an audio system of the vehicle based on the determination that the user is driving the vehicle.

Clause 87. The UE of any of clauses 77 to 86, further comprising: means for disabling other personal devices associated with the user and located in the vehicle based on the determination that the user is driving the vehicle; or means for disabling one or more features, applications, or both on the other personal devices based on the determination that the user is driving the vehicle.

Clause 88. The UE of any of clauses 77 to 87, further comprising: means for enabling crash detection based on the determination that the user is driving the vehicle.

Clause 89. The UE of clause 88, further comprising: means for notifying nearby user devices to enable crash detection.

Clause 90. The UE of any of clauses 77 to 89, further comprising: means for receiving a notification from the vehicle that the UE is associated with a driver profile preconfigured to the vehicle, wherein the determination that the user is driving the vehicle is further based on the UE being associated with the driver profile.

Clause 91. The UE of clause 90, further comprising: means for transmitting a request to the vehicle to report whether the UE is associated with the driver profile preconfigured to the vehicle, wherein the notification is received from the vehicle in response to the request.

Clause 92. The UE of any of clauses 77 to 91, further comprising: means for displaying a notification to the user to confirm that the user is driving the vehicle.

Clause 93. The UE of any of clauses 77 to 92, wherein the determination that the user is driving the vehicle is made in response to a determination that the UE is traveling faster than a speed threshold.

Clause 94. The UE of any of clauses 77 to 92, wherein the determination that the user is driving the vehicle is made before a determination that the UE is traveling faster than a speed threshold.

Clause 95. The UE of any of clauses 77 to 94, wherein: the determination that the user is driving the vehicle is further based on a determination that the UE is traveling faster than a speed threshold, and the Do Not Disturb While Driving mode is enabled further based on the determination that the UE is traveling faster than the speed threshold.

Clause 96. The UE of any of clauses 77 to 95, wherein the wearable device comprises: a smart watch, a smart ring, a fitness tracker, or smart glasses.

Clause 97. A user equipment (UE), comprising: means for determining that a user of the UE is not driving a vehicle; and means for disabling a Do Not Disturb While Driving mode of the UE based on the determination that the user is not driving the vehicle.

Clause 98. The UE of clause 97, further comprising: means for receiving sensor data from a wearable device associated with the user, wherein the determination that the user of the UE is not driving the vehicle is based on the sensor data from the wearable device.

Clause 99. The UE of clause 98, wherein: the sensor data comprises motion sensor data obtained by the wearable device, and the determination that the user is not driving the vehicle comprises a determination that the user is not driving the vehicle based on the motion sensor data indicating motion of the user that is inconsistent with turning a steering wheel of the vehicle.

Clause 100. The UE of clause 99, further comprising: means for receiving steering angle information from the vehicle, wherein the determination that the user is not driving the vehicle based on the motion sensor data indicating motion of the user that is inconsistent with turning the steering wheel of the vehicle is further based on the steering angle information.

Clause 101. The UE of any of clauses 99 to 100, wherein the determination that the user is not driving the vehicle based on the motion sensor data indicating motion of the user that is inconsistent with turning the steering wheel of the vehicle is based on: a crowdsourced database of motion patterns, a history of motion patterns of the user, a database of steering wheel dimensions, or any combination thereof.

Clause 102. The UE of any of clauses 99 to 101, further comprising: means for obtaining biometric sensor data from the wearable device based on the determination that the user is not driving the vehicle based on the motion sensor data indicating motion of the user that is inconsistent with turning the steering wheel of the vehicle, wherein the determination that the user is not driving the vehicle is further based on the biometric sensor data indicating that the wearable device is being worn by the user.

Clause 103. The UE of any of clauses 98 to 102, wherein: the sensor data comprises image data captured by the wearable device, and the means for determining that the user is not driving the vehicle comprises means for determining that the image data indicates that the user is not sitting in a driver's seat of the vehicle.

Clause 104. The UE of any of clauses 98 to 103, wherein the wearable device comprises: a smart watch, a smart ring, a fitness tracker, or smart glasses.

Clause 105. The UE of any of clauses 97 to 104, further comprising: means for receiving a notification from a user device of a driver of the vehicle to enable crash detection.

Clause 106. The UE of any of clauses 97 to 105, wherein the means for determining that the user is not driving the vehicle comprises: means for determining that the user is in a public transportation vehicle or a ride share vehicle.

Clause 107. The UE of any of clauses 105 to 106, wherein the determination that the user is in the public transportation vehicle or the ride share vehicle is based on information from an application installed on the UE associated with the public transportation vehicle of the ride share vehicle.

Clause 108. The UE of any of clauses 105 to 107, wherein the determination that the user is in the public transportation vehicle or the ride share vehicle is based on a type of transportation selected in a navigation application.

Clause 109. The UE of any of clauses 97 to 108, wherein the means for determining that the user is not driving the vehicle comprises: means for transmitting a request to the vehicle to report whether the UE is associated with a driver profile preconfigured to the vehicle; and means for receiving a notification from the vehicle that the UE is not associated with the driver profile preconfigured to the vehicle.

Clause 110. The UE of any of clauses 97 to 109, wherein the determination that the user is not driving the vehicle is made in response to a determination that the UE is traveling faster than a speed threshold.

Clause 111. The UE of any of clauses 97 to 109, wherein the determination that the user is not driving the vehicle is made before a determination that the UE is traveling faster than a speed threshold.

Clause 112. The UE of any of clauses 97 to 111, further comprising: means for enabling the Do Not Disturb While Driving mode of the UE based on a determination that the UE is traveling faster than a speed threshold, wherein the Do Not Disturb While Driving mode of the UE is disabled based on the determination that the user of the UE is not driving the vehicle.

Clause 113. A user equipment (UE), comprising: means for receiving sensor data from a wearable device associated with a user of the UE; means for determining that the user is in an impaired physical state based on the sensor data; means for detecting that the user is entering or is about to enter a vehicle; and means for transmitting a notification to the vehicle indicating that the user is in the impaired physical state to enable a driver monitoring system (DMS) of the vehicle to prevent the user from driving the vehicle.

Clause 114. The UE of clause 113, wherein the impaired physical state comprises: drunkenness, heartbeat irregularities, sleepiness, or any combination thereof.

Clause 115. A non-transitory computer-readable medium storing computer-executable instructions that, when executed by a user equipment (UE), cause the UE to: receive sensor data from a wearable device associated with a user of the UE; determine that the user is driving a vehicle based on the sensor data; and enable a Do Not Disturb While Driving mode of the UE based on the determination that the user is driving the vehicle.

Clause 116. The non-transitory computer-readable medium of clause 115, wherein: the sensor data comprises motion sensor data obtained by the wearable device, and the computer-executable instructions that, when executed by the UE, cause the UE to determine that the user is driving the vehicle based on the sensor data comprise computer-executable instructions that, when executed by the UE, cause the UE to determine that the user is driving the vehicle based on the motion sensor data indicating motion of the user consistent with turning a steering wheel of the vehicle.

Clause 117. The non-transitory computer-readable medium of clause 116, further comprising computer-executable instructions that, when executed by the UE, cause the UE to: receive steering angle information from the vehicle, wherein the determination that the user is driving the vehicle based on the motion sensor data indicating motion of the user consistent with turning the steering wheel of the vehicle is further based on the steering angle information.

Clause 118. The non-transitory computer-readable medium of clause 117, further comprising computer-executable instructions that, when executed by the UE, cause the UE to: determine that the motion of the user is not always consistent with the steering angle information; and provide a notification to the user to remind the user to keep both hands on the steering wheel.

Clause 119. The non-transitory computer-readable medium of any of clauses 117 to 118, wherein the motion sensor data indicates motion of the user consistent with turning the steering wheel of the vehicle based on the motion sensor data indicating motion of the user that is synchronized with the steering angle information for at least a threshold period of time.

Clause 120. The non-transitory computer-readable medium of any of clauses 116 to 119, wherein the determination that the user is driving the vehicle based on the motion sensor data indicating motion of the user consistent with turning the steering wheel of the vehicle is based on: a crowdsourced database of motion patterns, a history of motion patterns of the user, a database of steering wheel dimensions, or any combination thereof.

Clause 121. The non-transitory computer-readable medium of any of clauses 115 to 120, wherein: the sensor data comprises image data captured by the wearable device, and the computer-executable instructions that, when executed by the UE, cause the UE to determine that the user is driving the vehicle based on the sensor data comprise computer-executable instructions that, when executed by the UE, cause the UE to determine that the image data indicates that the user is sitting in a driver's seat of the vehicle.

Clause 122. The non-transitory computer-readable medium of any of clauses 115 to 121, further comprising computer-executable instructions that, when executed by the UE, cause the UE to: prevent user interaction with the UE based on the sensor data indicating that the vehicle is stopped; and permit user interaction with the UE based on the sensor data indicating that the vehicle is moving.

Clause 123. The non-transitory computer-readable medium of clause 122, wherein the user interaction comprises: making calls, receiving calls, receiving notifications, receiving text messages, sending text messages, or any combination thereof.

Clause 124. The non-transitory computer-readable medium of any of clauses 115 to 123, further comprising computer-executable instructions that, when executed by the UE, cause the UE to: prioritize access of the UE to an audio system of the vehicle based on the determination that the user is driving the vehicle.

Clause 125. The non-transitory computer-readable medium of any of clauses 115 to 124, further comprising computer-executable instructions that, when executed by the UE, cause the UE to: disable other personal devices associated with the user and located in the vehicle based on the determination that the user is driving the vehicle; or disable one or more features, applications, or both on the other personal devices based on the determination that the user is driving the vehicle.

Clause 126. The non-transitory computer-readable medium of any of clauses 115 to 125, further comprising computer-executable instructions that, when executed by the UE, cause the UE to: enable crash detection based on the determination that the user is driving the vehicle.

Clause 127. The non-transitory computer-readable medium of clause 126, further comprising computer-executable instructions that, when executed by the UE, cause the UE to: notify nearby user devices to enable crash detection.

Clause 128. The non-transitory computer-readable medium of any of clauses 115 to 127, further comprising computer-executable instructions that, when executed by the UE, cause the UE to: receive a notification from the vehicle that the UE is associated with a driver profile preconfigured to the vehicle, wherein the determination that the user is driving the vehicle is further based on the UE being associated with the driver profile.

Clause 129. The non-transitory computer-readable medium of clause 128, further comprising computer-executable instructions that, when executed by the UE, cause the UE to: transmit a request to the vehicle to report whether the UE is associated with the driver profile preconfigured to the vehicle, wherein the notification is received from the vehicle in response to the request.

Clause 130. The non-transitory computer-readable medium of any of clauses 115 to 129, further comprising computer-executable instructions that, when executed by the UE, cause the UE to: display a notification to the user to confirm that the user is driving the vehicle.

Clause 131. The non-transitory computer-readable medium of any of clauses 115 to 130, wherein the determination that the user is driving the vehicle is made in response to a determination that the UE is traveling faster than a speed threshold.

Clause 132. The non-transitory computer-readable medium of any of clauses 115 to 130, wherein the determination that the user is driving the vehicle is made before a determination that the UE is traveling faster than a speed threshold.

Clause 133. The non-transitory computer-readable medium of any of clauses 115 to 132, wherein: the determination that the user is driving the vehicle is further based on a determination that the UE is traveling faster than a speed threshold, and the Do Not Disturb While Driving mode is enabled further based on the determination that the UE is traveling faster than the speed threshold.

Clause 134. The non-transitory computer-readable medium of any of clauses 115 to 133, wherein the wearable device comprises: a smart watch, a smart ring, a fitness tracker, or smart glasses.

Clause 135. A non-transitory computer-readable medium storing computer-executable instructions that, when executed by a user equipment (UE), cause the UE to: determine that a user of the UE is not driving a vehicle; and disable a Do Not Disturb While Driving mode of the UE based on the determination that the user is not driving the vehicle.

Clause 136. The non-transitory computer-readable medium of clause 135, further comprising computer-executable instructions that, when executed by the UE, cause the UE to: receive sensor data from a wearable device associated with the user, wherein the determination that the user of the UE is not driving the vehicle is based on the sensor data from the wearable device.

Clause 137. The non-transitory computer-readable medium of clause 136, wherein: the sensor data comprises motion sensor data obtained by the wearable device, and the determination that the user is not driving the vehicle comprises a determination that the user is not driving the vehicle based on the motion sensor data indicating motion of the user that is inconsistent with turning a steering wheel of the vehicle.

Clause 138. The non-transitory computer-readable medium of clause 137, further comprising computer-executable instructions that, when executed by the UE, cause the UE to: receive steering angle information from the vehicle, wherein the determination that the user is not driving the vehicle based on the motion sensor data indicating motion of the user that is inconsistent with turning the steering wheel of the vehicle is further based on the steering angle information.

Clause 139. The non-transitory computer-readable medium of any of clauses 137 to 138, wherein the determination that the user is not driving the vehicle based on the motion sensor data indicating motion of the user that is inconsistent with turning the steering wheel of the vehicle is based on: a crowdsourced database of motion patterns, a history of motion patterns of the user, a database of steering wheel dimensions, or any combination thereof.

Clause 140. The non-transitory computer-readable medium of any of clauses 137 to 139, further comprising computer-executable instructions that, when executed by the UE, cause the UE to: obtain biometric sensor data from the wearable device based on the determination that the user is not driving the vehicle based on the motion sensor data indicating motion of the user that is inconsistent with turning the steering wheel of the vehicle, wherein the determination that the user is not driving the vehicle is further based on the biometric sensor data indicating that the wearable device is being worn by the user.

Clause 141. The non-transitory computer-readable medium of any of clauses 136 to 140, wherein: the sensor data comprises image data captured by the wearable device, and the computer-executable instructions that, when executed by the UE, cause the UE to determine that the user is not driving the vehicle comprise computer-executable instructions that, when executed by the UE, cause the UE to determine that the image data indicates that the user is not sitting in a driver's seat of the vehicle.

Clause 142. The non-transitory computer-readable medium of any of clauses 136 to 141, wherein the wearable device comprises: a smart watch, a smart ring, a fitness tracker, or smart glasses.

Clause 143. The non-transitory computer-readable medium of any of clauses 135 to 142, further comprising computer-executable instructions that, when executed by the UE, cause the UE to: receive a notification from a user device of a driver of the vehicle to enable crash detection.

Clause 144. The non-transitory computer-readable medium of any of clauses 135 to 143, wherein the computer-executable instructions that, when executed by the UE, cause the UE to determine that the user is not driving the vehicle comprise computer-executable instructions that, when executed by the UE, cause the UE to: determine that the user is in a public transportation vehicle or a ride share vehicle.

Clause 145. The non-transitory computer-readable medium of any of clauses 143 to 144, wherein the determination that the user is in the public transportation vehicle or the ride share vehicle is based on information from an application installed on the UE associated with the public transportation vehicle of the ride share vehicle.

Clause 146. The non-transitory computer-readable medium of any of clauses 143 to 145, wherein the determination that the user is in the public transportation vehicle or the ride share vehicle is based on a type of transportation selected in a navigation application.

Clause 147. The non-transitory computer-readable medium of any of clauses 135 to 146, wherein the computer-executable instructions that, when executed by the UE, cause the UE to determine that the user is not driving the vehicle comprise computer-executable instructions that, when executed by the UE, cause the UE to: transmit a request to the vehicle to report whether the UE is associated with a driver profile preconfigured to the vehicle; and receive a notification from the vehicle that the UE is not associated with the driver profile preconfigured to the vehicle.

Clause 148. The non-transitory computer-readable medium of any of clauses 135 to 147, wherein the determination that the user is not driving the vehicle is made in response to a determination that the UE is traveling faster than a speed threshold.

Clause 149. The non-transitory computer-readable medium of any of clauses 135 to 147, wherein the determination that the user is not driving the vehicle is made before a determination that the UE is traveling faster than a speed threshold.

Clause 150. The non-transitory computer-readable medium of any of clauses 135 to 149, further comprising computer-executable instructions that, when executed by the UE, cause the UE to: enable the Do Not Disturb While Driving mode of the UE based on a determination that the UE is traveling faster than a speed threshold, wherein the Do Not Disturb While Driving mode of the UE is disabled based on the determination that the user of the UE is not driving the vehicle.

Clause 151. A non-transitory computer-readable medium storing computer-executable instructions that, when executed by a user equipment (UE), cause the UE to: receive sensor data from a wearable device associated with a user of the UE; determine that the user is in an impaired physical state based on the sensor data; detect that the user is entering or is about to enter a vehicle; and transmit a notification to the vehicle indicating that the user is in the impaired physical state to enable a driver monitoring system (DMS) of the vehicle to prevent the user from driving the vehicle.

Clause 152. The non-transitory computer-readable medium of clause 151, wherein the impaired physical state comprises: drunkenness, heartbeat irregularities, sleepiness, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    receiving sensor data from a wearable device associated with a user of the UE, wherein the sensor data comprises motion sensor data generated by an inertial measurement unit in the wearable device;
    determining that the user is driving a vehicle based at least in part on the motion sensor data indicating motion of the user consistent with turning a steering wheel of the vehicle;
    enabling a Do Not Disturb While Driving mode of the UE based on the determination that the user is driving the vehicle; and
    enabling crash detection based on the determination that the user is driving the vehicle.

2. The method of claim 1, further comprising:
    receiving steering angle information from the vehicle,
    wherein the determination that the user is driving the vehicle based on the motion sensor data indicating motion of the user consistent with turning the steering wheel of the vehicle is further based on the steering angle information.

3. The method of claim 2, further comprising:
    determining that the motion of the user is not always consistent with the steering angle information; and
    providing a notification to the user to remind the user to keep both hands on the steering wheel.

4. The method of claim 1, wherein the determination that the user is driving the vehicle based on the motion sensor data indicating motion of the user consistent with turning the steering wheel of the vehicle is based on:
    a crowdsourced database of motion patterns,
    a history of motion patterns of the user,
    a database of steering wheel dimensions, or
    any combination thereof.

5. The method of claim 1, wherein:
    the sensor data comprises image data captured by the wearable device, and
    determining that the user is driving the vehicle based on the sensor data comprises determining that the image data indicates that the user is sitting in a driver's seat of the vehicle.

6. The method of claim 1, further comprising:
    permitting user interaction with the UE based on the sensor data indicating that the vehicle is stopped; and
    preventing user interaction with the UE based on the sensor data indicating that the vehicle is moving.

7. The method of claim 6, wherein the user interaction comprises:
    making calls,
    receiving calls,
    receiving notifications,
    receiving text messages,
    sending text messages, or
    any combination thereof.

8. The method of claim 1, further comprising:
    disabling other personal devices associated with the user and located in the vehicle based on the determination that the user is driving the vehicle; or
    disabling one or more features, applications, or both on the other personal devices based on the determination that the user is driving the vehicle.

9. The method of claim 1, further comprising:
    notifying nearby user devices to enable crash detection.

10. The method of claim 1, further comprising:
    determining that the user of the UE is not driving the vehicle; and
    disabling the Do Not Disturb While Driving mode based on the determination that the user is not driving the vehicle.

11. The method of claim 10, wherein:
    the method further comprises receiving second sensor data from the wearable device associated with the user,
    the second sensor data comprises image data captured by the wearable device, and
    determining that the user is not driving the vehicle comprises determining that the image data indicates that the user is not sitting in a driver's seat of the vehicle.

12. The method of claim 10, wherein determining that the user is not driving the vehicle comprises:
    determining that the user is in a public transportation vehicle or a ride share vehicle, and wherein:
    the determination that the user is in the public transportation vehicle or the ride share vehicle is based on information from an application installed on the UE associated with the public transportation vehicle or the ride share vehicle, or
    the determination that the user is in the public transportation vehicle or the ride share vehicle is based on a type of transportation selected in a navigation application.

13. The method of claim 10, further comprising:
    enabling the Do Not Disturb While Driving mode of the UE based on a determination that the UE is traveling faster than a speed threshold,
    wherein the Do Not Disturb While Driving mode of the UE is disabled based on the determination that the user of the UE is not driving the vehicle.

14. A user equipment (UE), comprising:
    one or more memories;

one or more transceivers; and one or more processors communicatively coupled to the one or more memories and the one or more transceivers, the one or more processors, either alone or in combination, configured to:

receive, via the one or more transceivers, sensor data from a wearable device associated with a user of the UE, wherein the sensor data comprises motion sensor data generated by an inertial measurement unit in the wearable device;

determine that the user is driving a vehicle based at least in part on the motion sensor data indicating motion of the user consistent with turning a steering wheel of the vehicle;

enable a Do Not Disturb While Driving mode of the UE based on the determination that the user is driving the vehicle; and enable crash detection based on the determination that the user is driving the vehicle.

15. The UE of claim 14, wherein the one or more processors, either alone or in combination, are further configured to:

receive, via the one or more transceivers, steering angle information from the vehicle, wherein the determination that the user is driving the vehicle based on the motion sensor data indicating motion of the user consistent with turning the steering wheel of the vehicle is further based on the steering angle information.

16. The UE of claim 15, wherein the one or more processors, either alone or in combination, are further configured to:

determine that the motion of the user is not always consistent with the steering angle information; and provide a notification to the user to remind the user to keep both hands on the steering wheel.

17. The UE of claim 14, wherein the determination that the user is driving the vehicle based on the motion sensor data indicating motion of the user consistent with turning the steering wheel of the vehicle is based on:

a crowdsourced database of motion patterns,
a history of motion patterns of the user,
a database of steering wheel dimensions, or
any combination thereof.

18. The UE of claim 14, wherein:

the sensor data comprises image data captured by the wearable device, and the one or more processors configured to determine that the user is driving the vehicle based on the sensor data comprises the one or more processors, either alone or in combination, configured to determine that the image data indicates that the user is sitting in a driver's seat of the vehicle.

19. The UE of claim 14, wherein the one or more processors, either alone or in combination, are further configured to:

permit user interaction with the UE based on the sensor data indicating that the vehicle is stopped; and prevent user interaction with the UE based on the sensor data indicating that the vehicle is moving.

20. The UE of claim 19, wherein the user interaction comprises:

make calls, receive, via the one or more transceivers, calls,
receive, via the one or more transceivers, notifications,
receive, via the one or more transceivers, text messages,
send, via the one or more transceivers, text messages, or
any combination thereof.

21. The UE of claim 14, wherein the one or more processors, either alone or in combination, are further configured to:

disable other personal devices associated with the user and located in the vehicle based on the determination that the user is driving the vehicle; or disable one or more features, applications, or both on the other personal devices based on the determination that the user is driving the vehicle.

22. The UE of claim 14, wherein the one or more processors, either alone or in combination, are further configured to:

notify nearby user devices to enable crash detection.

23. The UE of claim 14, wherein the one or more processors, either alone or in combination, are further configured to:

determine that the user of the UE is not driving the vehicle; and disable the Do Not Disturb While Driving mode based on the determination that the user is not driving the vehicle.

24. The UE of claim 23, wherein:

the one or more processors, either alone or in combination, are further configured to receive, via the one or more transceivers, second sensor data from the wearable device associated with the user, the second sensor data comprises image data captured by the wearable device, and the one or more processors configured to determine that the user is not driving the vehicle comprises the one or more processors, either alone or in combination, configured to determine that the image data indicates that the user is not sitting in a driver's seat of the vehicle.

25. The UE of claim 23, wherein the one or more processors configured to determine that the user is not driving the vehicle comprises the one or more processors, either alone or in combination, configured to:

determine that the user is in a public transportation vehicle or a ride share vehicle, and wherein:

the determination that the user is in the public transportation vehicle or the ride share vehicle is based on information from an application installed on the UE associated with the public transportation vehicle or the ride share vehicle, or the determination that the user is in the public transportation vehicle or the ride share vehicle is based on a type of transportation selected in a navigation application.

26. The UE of claim 23, wherein the one or more processors, either alone or in combination, are further configured to:

enable the Do Not Disturb While Driving mode of the UE based on a determination that the UE is traveling faster than a speed threshold, wherein the Do Not Disturb While Driving mode of the UE is disabled based on the determination that the user of the UE is not driving the vehicle.

* * * * *